United States Patent [19]
Michel et al.

[11] 3,930,943
[45] Jan. 6, 1976

[54] NUCLEAR POWER PLANT COMPONENT PROTECTION

[75] Inventors: Eberhard Michel, Nuremberg; Richard Ruf; Heinrich Dorner, both of Erlangen, all of Germany

[73] Assignee: Siemens Aktiengesellschaft, Munich, Germany

[22] Filed: Nov. 21, 1973

[21] Appl. No.: 417,798

[30] Foreign Application Priority Data
Nov. 28, 1972 Germany............................ 2258226

[52] U.S. Cl............................... 176/87; 176/DIG. 2
[51] Int. Cl.......................... G21f 3/00; G21c 11/02
[58] Field of Search.................... 176/87, 38, DIG. 2

[56] References Cited
UNITED STATES PATENTS

| | | | |
|---|---|---|---|
| 3,192,121 | 6/1965 | Challender et al. | 176/87 |
| 3,264,190 | 8/1966 | Janner | 176/38 |
| 3,716,451 | 2/1973 | Van Sickel et al. | 176/87 |

Primary Examiner—Benjamin A. Borchelt
Assistant Examiner—C. T. Jordan
Attorney, Agent, or Firm—Kenyon & Kenyon Reilly Carr & Chapin

[57] ABSTRACT

A nuclear power plant installation includes a concrete biological shield forming a pit in which a reactor pressure vessel is positioned. A steam generator on the outside of the shield is connected with the pressure vessel via coolant pipe lines which extend through the shield, the coolant circulation being provided by a coolant pump which is also on the outside of the shield. To protect these components on the outside of the shield and which are of mainly or substantially cylindrical shape, semicylindrical concrete segments are interfitted around them to form complete outer cylinders which are retained against outward separation radially from the components, by rings of high tensile steel which may be interspaced so closely that they provide, in effect, an outer steel cylinder. The invention is particularly applicable to pressurized-water coolant reactor installations.

9 Claims, 8 Drawing Figures

NUCLEAR POWER PLANT COMPONENT PROTECTION

BACKGROUND OF THE INVENTION

A pressurized-water coolant nuclear reactor power plant typically has a reactor pressure vessel positioned in a pit formed by a thick-walled biological shield made of concrete which is heat resistant and of great structural strength. The shield is itself radially enclosed by a cylindrical concrete wall of large enough diameter to provide an annular space in which one or more steam generators are positioned and which are connected with the pressure vessel by coolant pipe lines which extend through the biological shield. One of more coolant pumps are also located in this annular space and interposed in the coolant pipe lines to provide for forced coolant circulation. The entire installation is enclosed by a spherical steel containment enclosure required to positively prevent escape of potentially dangerous fluids to the outer atmosphere.

Every precaution must be taken to prevent this containment enclosure from being punctured or otherwise damaged in the event the components outside of the biological shield should fail and with explosive force produce projectiles from broken pieces of metal. The cylindrical concrete wall which surrounds these components does not have the thickness and structural strength of the biological shield and, therefore, does not provide the maximum possible security against damage to the containment enclosure. If this enclosure is punctured, the coolant released by the failure escapes to the atmosphere.

A pressurized-water coolant reactor steam generator, and some other types, externally is a tall cylindrical shape possibly changing in diameter but remaining a substantially cylindrical construction. The coolant pipe lines are, of course, cylindrical. Only the coolant pump has a shape other than cylindrical. All of these parts are made of metal, normally steel, and they are highly stressed thermally and operate under the internal pressure of the water coolant which must be kept under a pressure high enough to keep it in its liquid phase.

An obvious solution to the problem of providing the greater security that is so plainly desirable might appear to be to enclose the components by concrete constructions massive enough to provide effective mechanical shielding for the steel containment enclosure. However, such a solution involves great cost and does not in any event provide vertical protection unless a completely closed roof is provided.

The object of the present invention is to provide greater security against such possible damage to the containment enclosure, without involving the great expense, and impracticality, of the above kind of solution.

SUMMARY OF THE INVENTION

According to the invention, each of the cylindrical components operating at the high temperatures and internal pressures, is completely enclosed individually by temperature-resistant, mechanically strong concrete, externally reinforced by a substantially continuous wall made of high tensile steel. In this way each individual component is securely confined in the event it fails. An explosion cannot result in flying steel projectiles. To some extent, the risk of failure is reduced because at least part of the mechanical stress on the components, resulting from the high internal pressures, is carried by the concrete and steel walls enclosing the components.

To make this concept practical, the concrete is cast in the form of segments of a complete cylinder which are circumferentially interfitting to form a complete cylinder enclosing the component. This permits the segments to be installed around the component. The outer steel protection is provided by rings of steel bar, preferably of rectangular cross section, with the rings interfitted so closely so as to possibly actually abut in the axial direction, to provide the effect of a continuous steel wall.

A pressurized-water coolant reactor steam generator is larger in diameter and axial extent than the coolant pipe lines. Therefore, for this component the concrete segments are cast so that when assembled they form a plurality of axially superimposed cylindrical rings for both easy installation and greater security. The axially abutting ends of these concrete rings are formed with mutually interlocking annular steps, the interlocking action being in the radial direction. Thick steel plates are positioned against the top and bottom of the steam generator and high-tensile strength steel tension elements in the form of a cylindrical series of uniformly circumferentially spaced bars or rods are passed lengthwise or axially through the interfitted concrete segments and connected with these steel plates. The length of these steel bars are proportioned so that when the installation is cold the bars via the steel end plates apply only light compression to the concrete rings in the vertical or axial direction. Thereafter when the steel generator is in operation and hot, the concrete rings attempt to expand vertically or axially but are kept from doing so by the steel bars and end plates, the result being that the concrete rings are placed under substantial axial compression, avoiding the need for initially tensioning the tension rods to prestress the concrete parts. These rods may be solid but preferably they are in the form of steel wire cable permitting them to be handled more easily during assembly of the concrete protection, suitable bar or cable end fittings extending through the two plates for tensioning of the bars or wire cables by the use of nuts engaging the outsides of the end plates.

The segments are preferably cast in sheet steel shells resulting in the finished segments being metal-cased, this permitting easier handling and interfitting of the segments. This is particularly advantageous in the case of the segments for the steam generator. Such segments must also be provided with axial holes for passage of the tension bars or wire cables which place the finished concrete shell under axial compression. Because of the outermost steel cylinder formed by the abutting high tensile steel rings, with proper proportioning of the latter in the as-cold condition, under steam generator operating conditions radial compression is also applied to the segments because of their thermal expansion.

Simpler semicylindrical concrete segments may be used in the case of the coolant pipe lines. However, here again, the axial tension rods or wire cables are preferably used together with the external steel reinforcing wall. For the axially extending steel cables or bars, steel flanges may be connected where required to the ends of the concrete enclosures for the pipe lines. In this case the axial tension elements may be on the outside of the concrete parts.

A coolant pump does not normally have a cylindrical exterior. This makes the use of cast concrete segments less practical, so for this pump high tensile strength steel castings are used. These castings may be in the form of two shells having longitudinally extending flanges so that they may be bolted together to encase the pump.

In the foregoing way, each individual component is provided with complete security against the formation of projectiles in the case of a structural failure. Great advantages are obtained concerning both installation and cost as compared to any attempt to enclose all of the components by a single concrete enclosure providing equal intercept capability. Further, to permit inspection of the components, the segments can be disassembled, this also providing for repair and even replacement of a component.

BRIEF DESCRIPTION OF THE DRAWINGS

Specific examples of this invention are illustrated by the accompanying drawings, in which.

DETAILED DESCRIPTION OF THE INVENTION

Figure 1:
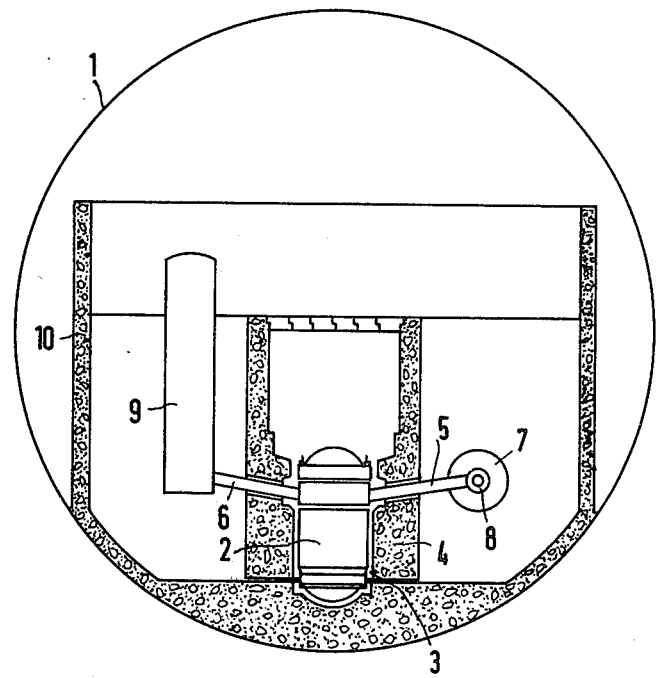
FIG. 1 schematically shows in vertical section a typical pressurized-water coolant reactor installation.
Figure 2:
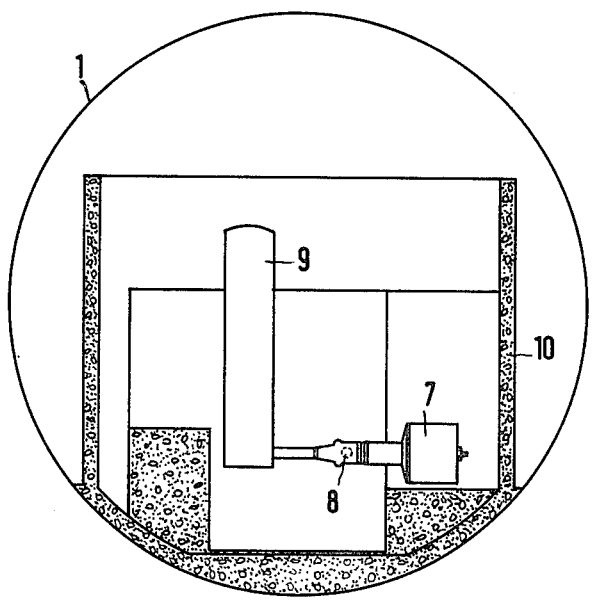
FIG. 2 shows the installation of FIG. 1 rotated 90°.

Referring now to the above drawings, FIGS. 1 and 2, as schematic representations, illustrate the containment enclosure 1 which is a spherical shell made of steel plates, and the pressurized-water coolant nuclear reactor pressure vessel 2 located in the pit 3 of a cylindrical concrete biological shield 4 providing protection not only biologically but also physically in the event of failure of the pressure vessel 2. Although schematically represented, it can be seen that the coolant lines 5 and 6, carrying the pressurized-water coolant, extend through the shield 4, the coolant being circulated by the power of an electric motor 7 which drives the main coolant pump 8, establishing circulation to and from the pressure vessel 2 by way of the steam generator 9. In addition to the biological shield 4, these components comprising the coolant lines, the main coolant pump and the steam generator, are enclosed by the vertical cylindrical wall 10 previously referred to.

Figure 3:
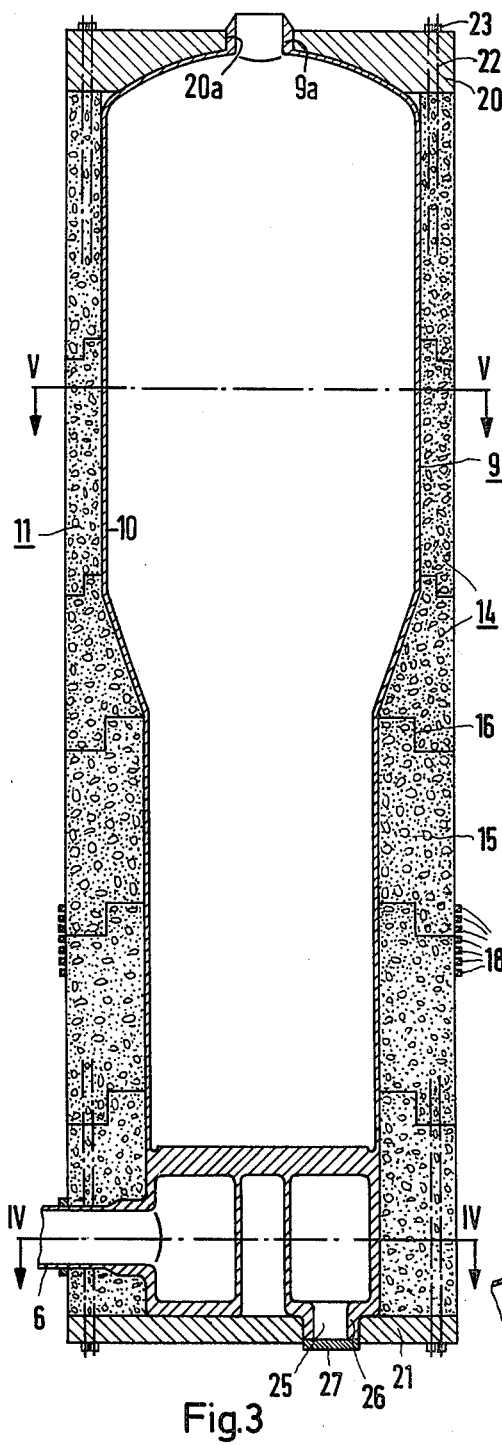
FIG. 3 in vertical section shows the invention as applied to a typical pressurized-water coolant reactor steam generator, the interior construction of the latter being eliminated to avoid confusion.
Figure 4:
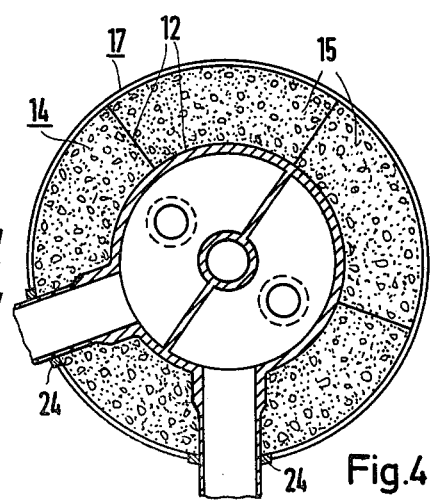
FIG. 4 is a cross section taken on the line 4—4 in FIG. 3.
Figure 5:
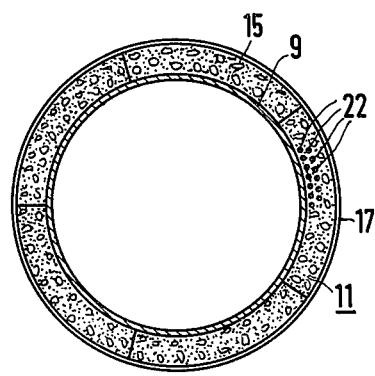
FIG. 5 is a cross section taken on the line 5—5 in FIG. 3 but on a slightly reduced scale.

FIGS. 3 through 5 illustrate the application of the principles of the invention to a steam generator for the installation schematically shown by FIGS. 1 and 2. In this case the upper portion of the steam generator has a larger diameter than the lower portion but the overall contour is mainly or substantially cylindrical. The concrete protection previously referred to is generally indicated at 11.

This concrete protection, provided individually for the steam generator, comprises a series of concrete rings 14 formed by segmental cylindrical segments 15 made of concrete castings. The concrete used should be resistant to the high temperatures to be expected and should provide substantial mechanical strength. In addition, the concrete should be a poor thermal conductor. The segments 15 are interfitted as illustrated by FIG. 4 to form the rings 14, the mutually circumferentially abutting ends of the segments being flat and fitting tightly together.

Due to the height or vertical extent of the steam generator, the concrete intercept construction of this invention is here formed with the segments forming rings 14 having axial or longitudinal lengths substantially less than the full extent of the steam generator, so that a number of the rings stacked one on top of the other in endwise relation are used to completely enclose the steam generator. The longitudinally or axial abutting ends of the different rings are formed as steps 16, these being annular steps and made so that as to each adjacent two of the concrete rings the mutually abutting end surfaces interfit, interlock and prevent radial displacement during and after the assembly or installation procedure.

After the concrete segments are assembled so as to completely cover the wall of the steam generator 9, the high tensile strength steel bars 17 are stacked around the various levels of rings with these steel bars formed as rings which extend as a layer for the full height of the protected steam generator. The bars 18 are arranged as rings close together so as to form a substantially continuous cylinder of high tensile strength steel enclosing the conrete segments, holding them together and providing for general reinforcement. Only a few of these steel rings 18 are illustrated, to avoid confusion.

These rings of steel 18 are not only made from high tensile strength steel, but preferably are of rectangular cross section so that they can be placed in substantially abutting relationship with respect to each other.

The previously referred to steel plates 20 and 21 are shown as engaging the top and bottom of the steam generator. The steel plate at the bottom can be flat to fit the normally flat bottom of the steam generator, while the inside of the top plate 20 is contoured to fit the normally dome-shaped top of the steam generator and is, of course, provided with a central opening 20a for the steam generator's steam output outlet connection 9a. The axially extending tension rods 22, preferably wire cables, are shown partially in FIG. 3 and also in FIG. 5, as extending axially through holes formed in the concrete castings and extending between the plates 20 and 21, these tension rods or wire cables being equipped with nuts 23 which engage the outside of the plates 20 and 21 respectively. It is preferred that these tension rods or wire cables be positioned reasonably close to the inside contour of the generally circular shapes of the end plates 20 and 21 to reduce the bending moments introduced to the latter when accepting the stresses. These bars or wire cables should be uniformly distributed around the entire periphery of the concrete enclosure for the steam generator and they may be arranged as concentric cylindrical radially interspaced series of elements uniformly interspaced around the entire periphery of the construction, as generally indicated by FIG. 5. Incidentally in both FIGS. 4 and 5 the holes required for the passage of these tension rods or wire cables are not illustrated to avoid confusion of the details.

As indicated by FIG. 4, the steam generator's coolant supply line connections may be provided with flanges 24 for use as subsequently described, and, or course, the concrete castings must be formed and shaped suitably to accommodate the coolant connections.

To facilitate the casting of the segments 15, the concrete is preferably cast into sheet steel casings 12 having the required shape, serving to facilitate the casting and eventually providing the cast concrete segments with smooth metallic exteriors with the concrete encased by the fitted steel.

In FIG. 3 the bottom steel plate 21 is provided with an opening through which one of the coolant manifold inspection manholes 25 extends, this being provided by a stub 26 which extends through the hole in the heavy bottom steel plate 21 and is provided with a suitably strong manhole cover 27. The burst or explosive protection provided by the present invention need not be disassembled to permit inspection of the manifold of the steam generator.

Although FIG. 5 shows two uniformly distributed levels of annular series of vertical or axially extending tension rods or wire cables 22, other arrangements could be used. It is of advantage to arrange them close to the steam generator casing to avoid large bending moments in the steel end plates of the new protection arrangement when the tension elements are highly tensioned. Such tensioning of the tension rods or cables may be effected by dimensioning the lengths of the rods or cables so that when the assembly is cold the elements 22 are only lightly tensioned with the result that the end plates 20 and 21 place little axial or vertical compression on the concrete components. When the steam generator is put into service, the concrete components thermally attempt to expand; such expansion is resisted by the end caps held together by the tension elements, with the result that the concrete is placed in axial or vertical compression. The degree of this compression depends upon the coefficient of thermal expansion of the concrete relative to that of the steel components, the amount of initial tightening of the elements 22, and the difference in the temperatures of the as-cold and operating conditions of the equipment of the steam generator and its protective covering.

Figure 6:
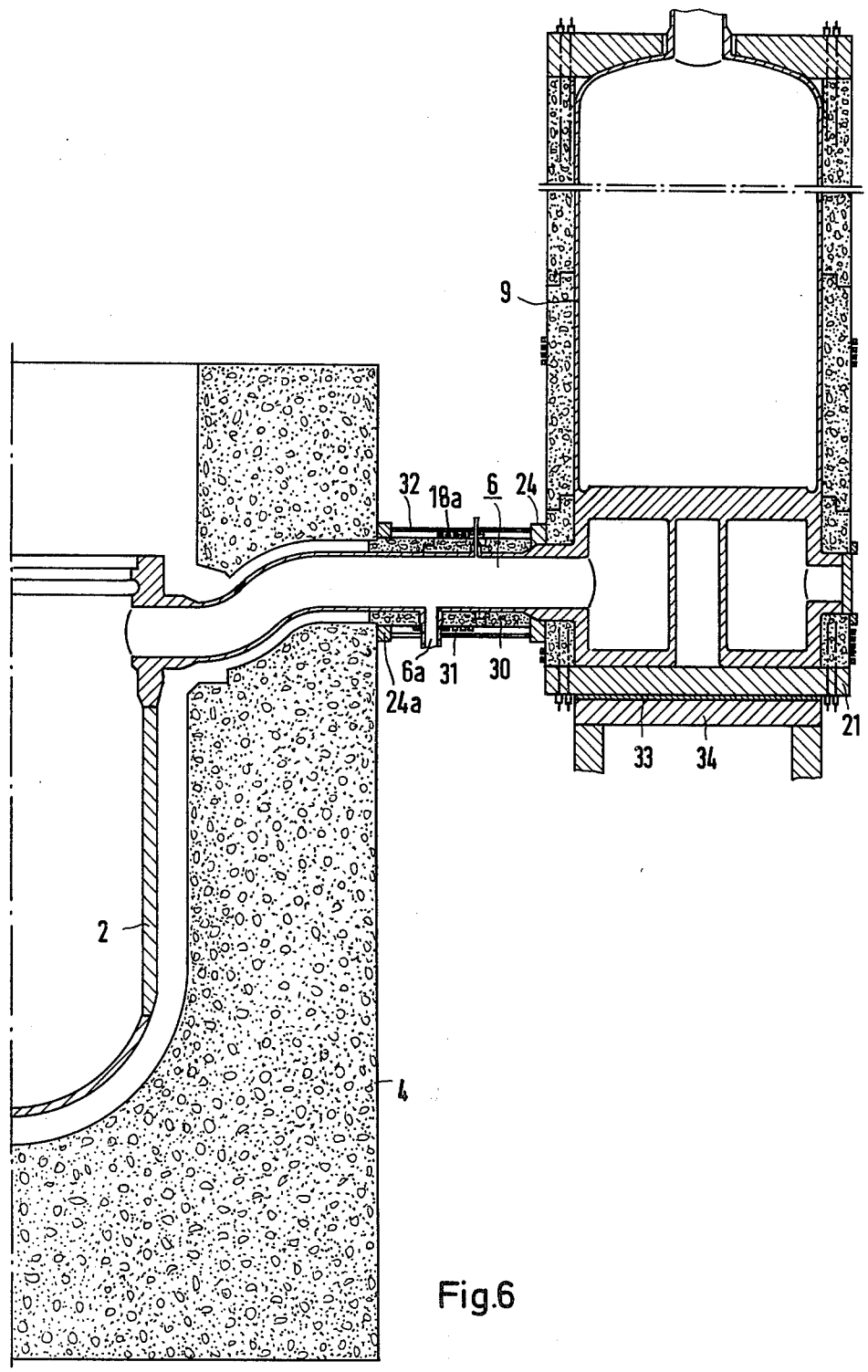
FIG. 6 in vertical section shows a portion of the biological shield and pressure vessel of the installation, together with one of the coolant pipe lines connecting with a steam generator, with an application of the invention to such components.

FIG. 6 provides an example of how the coolant pipe lines may be protected by the present invention. In this case two semicylindrical halves 30 of the concrete previously described, are assembled around the coolant pipe line 6. One of the flanges 24, previously described, via the tensioning cables 31 and 32, connecting this flange 24 with a flange 24a fixed to the biological shield 4. If a branch connection such as is indicated at 6a is involved, the interjoining axially extending portions of the two concrete halves may be provided with a suitable contour to embrace this branch line. If the pipe line 6 is long enough to make it advisable, a number of shorter lengths of the section 30 may be assembled.

The construction illustrated by FIG. 6 integrates the steam generator 9 with the biological shield, and the coolant pipe line 6, with its protection system is subject to thermal expansion and contraction of necessity. Therefore, the steam generator is shown as being provided with an antifriction layer 33 interposed between the bottom plate 21 of this generator's protective system and the base 34 which supports the steam generator. This layer 33 may be composed of a large number of small diameter rollers although this detail is not illustrated specifically. The layer 33 should permit the steam generator to move freely and without being stressed as the coolant pipe line 6 and its concrete protection 30 expand and contract. Of course, another coolant line not shown by FIG. 6 is required to form a coolant loop or circuit, and if this introduces oppositely directed forces tending to displace the steam generator, the antifriction layer 33 should provide for this also, such as by comprising a large number of small steel ball bearings of adequate capacity for the weight involved and permitting motion in all planes on the part of the steam generator.

Figure 7:
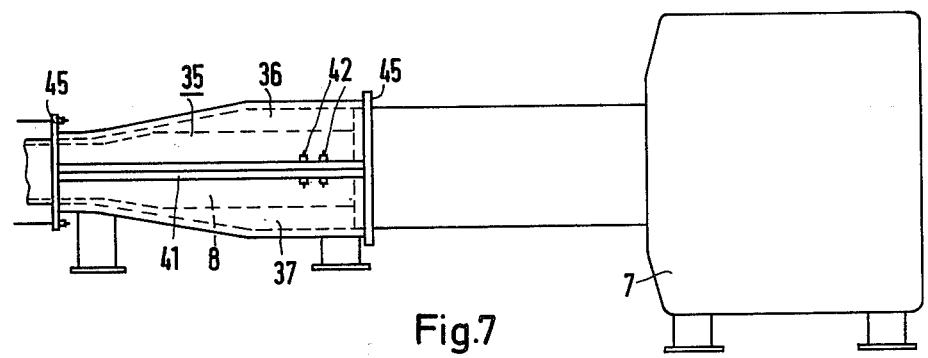
FIG. 7 shows the principles of the invention as applied to the coolant pump, this being an elevation view.
Figure 8:
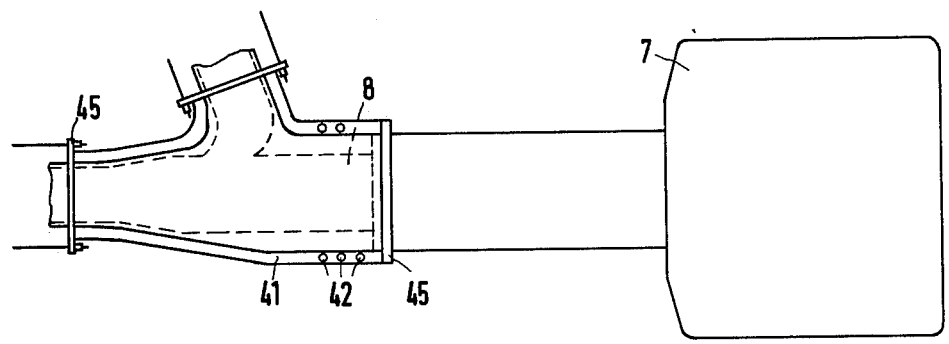
FIG. 8 is the same as FIG. 7 but is a plan view.

Going now to FIGS. 7 and 8, here the pump 8 is shown and which, of course, also operates under the internal pressure of the coolant. Here the protection is indicated at 35 as comprising two cast metal shells 36 and 37, the metal being a high tensile castable steel, each section being shaped to internally fit the external contour of the pump 8 and the two halves having longitudinally extending flanges 41 bolted together by fastenings, such as nuts and bolts, 42. The ends of these castings are shown as peripheral flanges 45 permitting connections with the concrete axial reinforcement members such as shown at 31 and 32 in FIG. 6.

Incidentally, FIG. 6 serves to show that the longitudinal tensioning members may be passed either through the concrete segments or located on the outside of these segments, the positions used being indicated by the stresses to be expected and the sizes involved. When the tension rods are on the outside as indicated at 31 and 32 in FIG. 6, the cylindrical high tensile strength steel encirclement of the concrete segments may be positioned on the outside of the concrete segments and on the inside of the tension bars or wire cables, as indicated at 18a in FIG. 6.

What is claimed is:

1. A nuclear power plant installation comprising a concrete biological shield forming a pit, a reactor pressure vessel positioned in said pit, a steam generator having a substantially cylindrical side wall and positioned on the outside of said pit, and coolant pipe lines of substantially cylindrical shape and interconnecting said vessel and generator by extending through said shield; wherein the improvement comprises segmentally cylindrical segments interfitted to form cylindrical enclosures surrounding said generator and line on the outside of said shield, and which are made of non-metallic heat-insulating material, and high-tensile strength metal elements encircling said segments.

2. The installation of claim 1 in which said segments are made of concrete.

3. The installation of claim 2 in which said segments are enclosed by sheet metal casings.

4. The installation of claim 3 in which said segments form a series of cylindrical rings with each two adjacent rings having their end formed with mutually interlocking steps.

5. The installation of claim 4 in which said rings are axially held together by axially extending high-tensile strength tension elements uniformly distributed circumferentially throughout said enclosures.

6. The installation of claim 5 in which said enclosures have metal end members to which said tension elements are connected.

7. The installation of claim 6 in which said tension elements have lengths proportioned relative to the lengths of said enclosure when cold so that with thermal expansion of said enclosures the latter are placed under axial compression.

8. The installation of claim 7 in which said steam generator is positioned by means permitting the generator to move to relieve stress when said pipe line's enclosures thermally expand and contract axially.

9. The installation of claim 1 in which a coolant pump is on the outside of said shield and connected with said pipe line, said pump being of other than cylindrical shape and being enclosed by interfitting shells made of metal.

* * * * *